US007936105B2

(12) United States Patent
Martin et al.

(10) Patent No.: US 7,936,105 B2

(45) Date of Patent: May 3, 2011

(54) AUDIBLE BRUSH WEAR INDICATOR FOR ROTATING ELECTRIC MACHINES

(75) Inventors: Robert Martin, West Bloomfield, MI (US); Seiji Kondo, Novi, MI (US)

(73) Assignees: DENSO International America, Inc., Southfield, MI (US); Denso Corporation, Kariya (JP)

( * ) Notice: Subject to any disclaimer, the term of this patent is extended or adjusted under 35 U.S.C. 154(b) by 95 days.

(21) Appl. No.: 12/413,889

(22) Filed: Mar. 30, 2009

(65) Prior Publication Data

US 2010/0244621 A1 Sep. 30, 2010

(51) Int. Cl.
*H02K 13/00* (2006.01)

(52) U.S. Cl. .................................................. 310/248

(58) Field of Classification Search .................. 310/242, 310/248, 245, 251

See application file for complete search history.

(56) References Cited

U.S. PATENT DOCUMENTS

| | | | | |
|---|---|---|---|---|
| 2,691,114 | A | 10/1954 | Lykins | |
| 3,523,288 | A | 8/1970 | Thompson | |
| 4,024,525 | A | 5/1977 | Baumgartner et al. | |
| 4,121,207 | A | 10/1978 | Jones | |
| 4,166,227 | A | 8/1979 | Guglielmo | |
| 4,172,988 | A | 10/1979 | Lowther | |
| 4,272,695 | A | 6/1981 | Buchwald et al. | |
| 4,316,186 | A | 2/1982 | Purdy et al. | |
| 4,329,683 | A | 5/1982 | Kimberlin | |
| 4,333,095 | A | 6/1982 | Silva | |
| 4,344,009 | A | 8/1982 | Reynolds | |
| 4,348,608 | A | 9/1982 | Michael | |
| 4,420,705 | A | 12/1983 | Kimberlin | |
| 4,471,254 | A | 9/1984 | Yamada et al. | |
| 4,488,078 | A | 12/1984 | Orton | |
| 4,513,495 | A | 4/1985 | Kimberlin | |
| 4,528,557 | A | 7/1985 | Braun | |
| 4,593,220 | A | 6/1986 | Cousins et al. | |
| 4,677,329 | A | 6/1987 | Secoura | |
| 4,723,084 | A | 2/1988 | Reynolds | |
| 4,739,208 | A | 4/1988 | Kimberlin | |
| 4,743,787 | A | 5/1988 | Bunner et al. | |
| 4,761,594 | A | 8/1988 | Rodi et al. | |
| 4,800,312 | A | 1/1989 | Wacek et al. | |
| 4,831,302 | A | 5/1989 | Dietrich et al. | |
| 4,918,348 | A | 4/1990 | Fitzsimmons et al. | |
| 4,950,933 | A | 8/1990 | Pipkin et al. | |
| 4,977,345 | A | 12/1990 | Toperzer | |
| 5,177,419 | A * | 1/1993 | Pickering et al. | 318/541 |
| 5,509,625 | A | 4/1996 | Oullette et al. | |
| 5,708,317 | A | 1/1998 | Siegel et al. | |
| 5,731,650 | A | 3/1998 | Scheucher | |
| 5,739,619 | A | 4/1998 | Thornley | |
| 5,753,995 | A | 5/1998 | Ogino | |
| 5,870,026 | A | 2/1999 | Challenger | |
| 6,255,955 | B1 | 7/2001 | Blaettner | |
| 6,838,803 | B2 * | 1/2005 | Kiyota | 310/242 |

FOREIGN PATENT DOCUMENTS

| | | |
|---|---|---|
| JP | 2006-223078 | 8/2006 |

* cited by examiner

*Primary Examiner* — Nguyan N Hanh

(74) *Attorney, Agent, or Firm* — Harness, Dickey & Pierce, PLC

(57) ABSTRACT

An electric machine incorporates a brush assembly that provides an audible warning when the brush in the brush assembly approaches the end of its useable length. The brush incorporates a device incorporated into the brush or a brush design which cooperates with the brush holder to generate the noise. The noise provides a warning to the user of the electric machine that the useable length of the brush material is near.

12 Claims, 5 Drawing Sheets

AUDIBLE BRUSH WEAR INDICATOR FOR ROTATING ELECTRIC MACHINES

FIELD

The present disclosure is directed to electric machines which utilize electrical brushes. More particularly, the present disclosure is directed to an audible wear indicator for the electrical brushes of a rotating electric machine.

BACKGROUND

This section provides background information related to the present disclosure which is not necessarily prior art.

Electric machines typically are devices that convert electrical energy into mechanical energy (motors) or devices that convert mechanical energy into electrical energy (generators, alternators). These electric machines utilize electrical brushes, typically a mix of copper and carbon, to transfer electricity between a pigtail wire and a rotating commutator mounted on an armature or a rotor mounted in the electric machine.

The electrical brushes are typically held in contact with the commutator using mechanical springs. As the electrical brushes wear beyond the point of a minimum brush spring force, the mechanical springs may no longer maintain the contact between the electrical brush and the commutator.

For automotive vehicles, one of the most common problems for starter motors and alternators is the wearing out of the electrical brushes. Existing starter motors and alternators provide no warning to the operator of the vehicle when the electrical brushes approach the point of wearing out. Even though electrical brush wear out does not typically occur until after many years of vehicle service, the fact remains that no warning is given and the resulting inoperative condition of the starter motor or the alternator can cause significant inconvenience. On the day when the electrical brushes wear out, the resulting inoperative condition of the starter motor or the alternator can leave the vehicle operator stranded when he attempts to start a stopped vehicle or it can leave the vehicle operator stranded after an hour or so while the vehicle runs on its battery charge.

As automotive vehicles are developed into electric automobiles and hybrid automobiles for example, starter motors and alternators will be cycled more frequently creating a much more severe operating environment. This has the potential to increase the duty cycle of the electrical brushes and to place more emphasis on the life of the electrical brushes and some type of warning being given when the wear of the electrical brushes is near its maximum wear condition.

SUMMARY

This section provides a general summary of the disclosure, and is not a comprehensive disclosure of its full scope or all of its features.

The present disclosure provides a warning for the operator of the vehicle when the electrical brushes approach the end of their useful life. The electrical brushes of the present disclosure are provided with a device that generates a sound when the electrical brushes approach their maximum wear point. Vehicle operators tend to associate an objectionable noise from a vehicle as an indication that something is wrong with the vehicle which needs to be repaired. This objectionable noise is more effective than a warning light on the dashboard which many operators tend to ignore if they do not feel any reduced performance of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
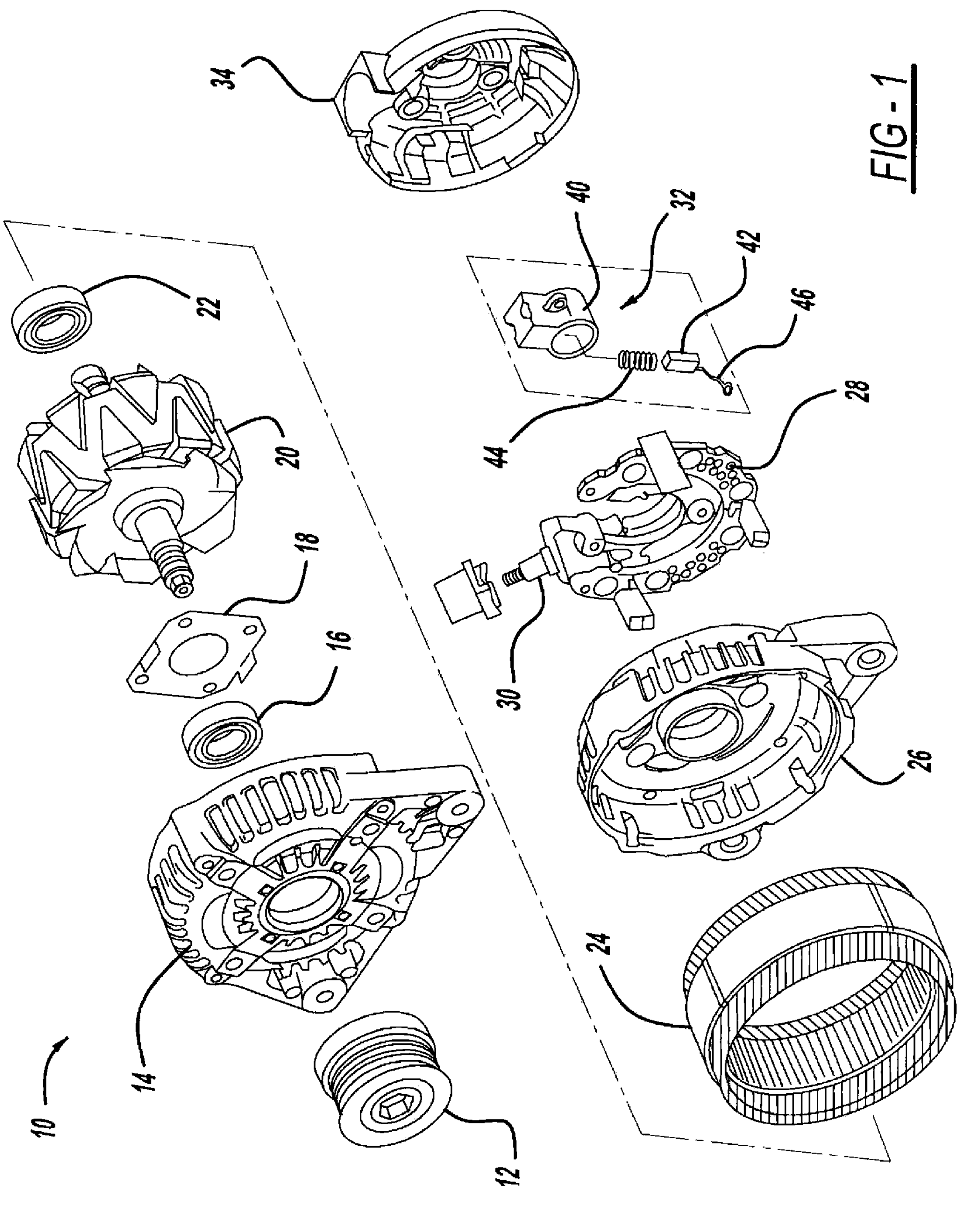
FIG. 1 is an exploded perspective view of an alternator which incorporates the electrical brush audio wear indicator in accordance with the present disclosure.

Example embodiments will now be described more fully with reference to the accompanying drawings. There is illustrated in FIG. 1 an alternator which incorporates the electrical brush assembly in accordance with the present disclosure and which is identified by the reference numeral 10. Alternator 10 comprises a pulley 12, a drive frame 14, a front bearing 16, a bearing retainer 18, a rotor 20, a rear bearing 22, a stator 24, a rear frame 26, a rectifier assembly 28, a B+ terminal 30, a brush assembly 32, and a rear cover 34.

Stator 24 is secured to drive frame 14 and rear cover 34 typically by using a plurality of bolts. Rotor 20 is disposed within stator 24 and rotor 20 is rotatably supported by front bearing 16 which is attached to drive frame 14 using bearing retainer 18 and rear bearing 22 which is typically press fit within rear frame 26. Pulley 12 is secured for rotation to the shaft of rotor 20 using typically a retaining nut and a lock washer. An automotive engine (not shown) provides power for the rotation of rotor 20 within stator 24 through a belt which engages pulley 12 as is well known in the art. The rotation of rotor 20 within stator 24 generates electricity for the operation of the engine, the charging of the battery (not shown) and the operation of other electrical devices present in the vehicle as is well known in the art.

Brush assembly 32 comprises a brush holder 40, one or more brushes 42 and a brush spring 44 associated with each brush 42. Brush holder 40 is attached to rear frame 26. Brushes 42 slidingly engage brush holder 40 and are urged against the shaft of rotor 20 by brush springs 44. A pigtail wire 46 is attached to each brush 42 to transfer the electrical power from brushes 42 to the alternator rotor or armature. The shaft of rotor 20 typically includes a copper surface against which brushes 42 are urged by brush springs 44. Typically, the copper surface is called a slip ring or a commutator. The rotation of rotor 20 with respect to brushes 42 causes mechanical friction due to the rotating movement of the shaft of rotor 20 with respect to brushes 42. This mechanical friction, as well as the electrical interaction, cause brush wear. Brush springs 44 are used to keep brushes 42 in contact with the shaft of rotor 20. Each brush 42 has a specified useable length due to the design limitations of brush springs 44. When brush 42 reaches a critical length, after the specified useable length has worn away, brush 42 will lose contact with the shaft of rotor 20 causing alternator 10 to become inoperative.

Figure 2A:
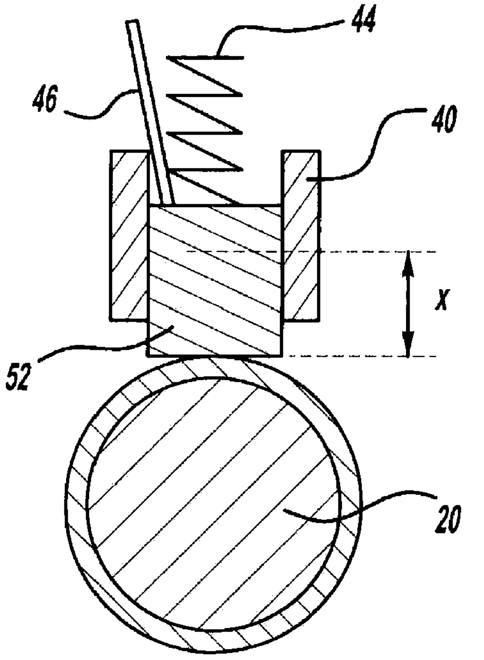
FIG - 2A Prior Art
FIG. 2A is a schematic view of a prior art new electrical brush assembly.
Figure 2B:
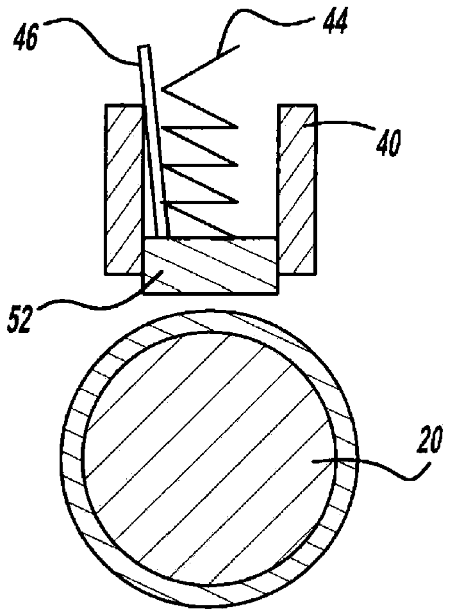
FIG - 2B Prior Art
FIG. 2B is a schematic view of the electrical brush assembly in FIG. 2A in a used condition.

Referring now to FIGS. 2A and 2B, a prior art brush 52 is illustrated. As shown in FIG. 2A, a new brush 52 has a specified useable length X and it is slidingly held in brush holder 40 with brush spring 44 urging brush 52 into engagement with the shaft of rotor 20. Pigtail wire 46 extends from brush 52 to transfer the electric power. At the end of the life of brush 52, as illustrated in FIG. 2B, the useable length X has worn away and a clearance is formed between brush 52 and the shaft of rotor 20. This causes alternator 10 to become inoperative and in the prior art alternators, there is no warning given to the operator of the vehicle who may become stranded due to the inoperability of the alternator and thus the vehicle.

Figure 3A:
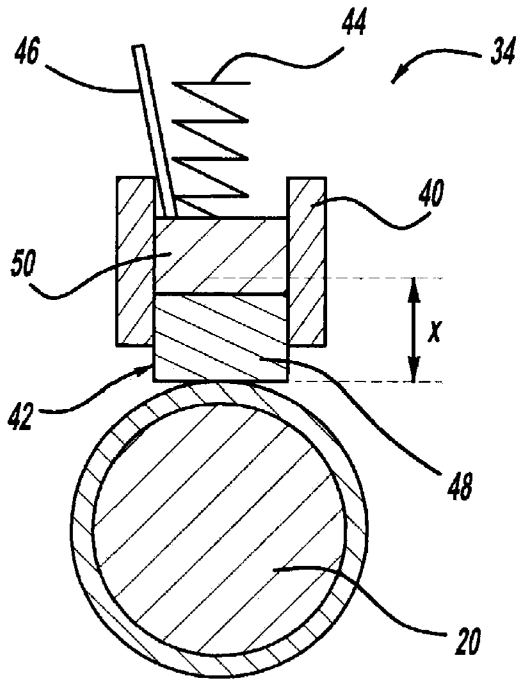
FIG. 3A is a schematic view of a new electrical brush assembly in accordance with the present disclosure.
Figure 3B:
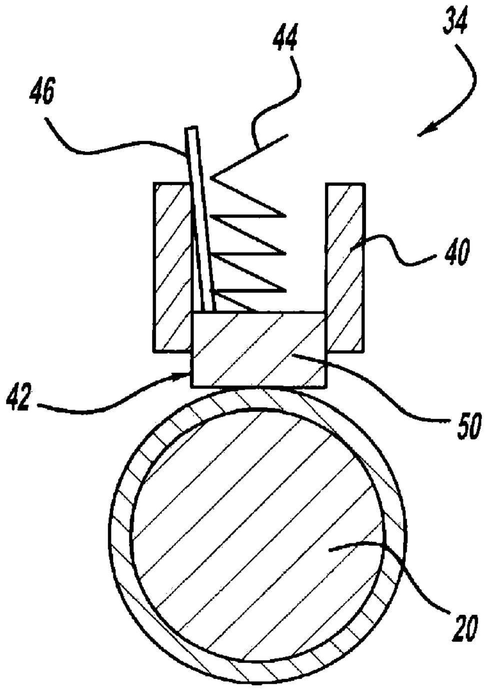
FIG. 3B is a schematic view of the electrical brush assembly in FIG. 3A in a used condition.

Referring now to FIGS. 3A and 3B, brush assembly 32, which incorporates brush 42, is illustrated. Brush 42 is a two material brush where the first material 48 is the standard carbon and copper material from a prior art brush. This first material extends for a distance which is less than the useable length X as is illustrated in FIG. 3A. The second material 50 is a material that is electrically conductive but it is also a material that will generate noise due to the mechanical friction that is generated between the shaft or rotor 20 and brush 42. Thus, as illustrated in FIG. 3B, as brush 42 approaches the end of its useable length, the second material 50 will come into contact with the shaft of rotor 20 and noise will be generated which will provide a warning to the operator of the vehicle that the alternator is nearing the end of its useable length of brush material and that inoperability of the alternator is near. An example of the second material could be carbon, copper and the substance which generates the noise.

Figure 4A:
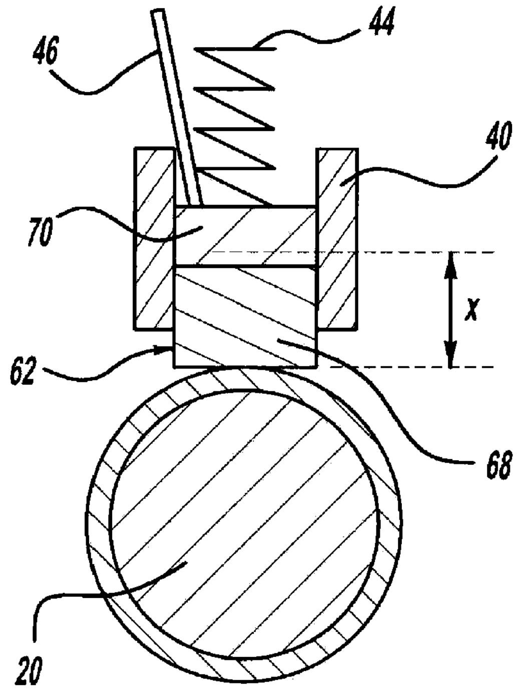
FIG. 4A is a schematic view of a new electrical brush assembly in accordance with another embodiment of the present disclosure.
Figure 4B:
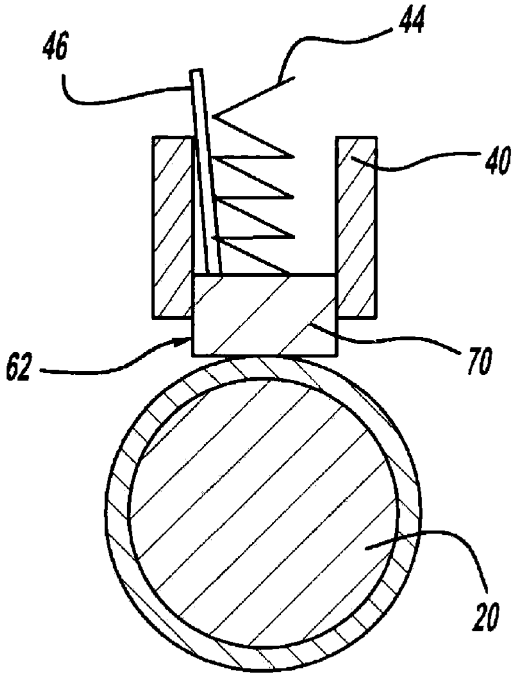
FIG. 4B is a schematic view of the electrical brush assembly in FIG. 4A in a used condition.

Referring now to FIGS. 4A and 4B, a brush assembly comprising brush holder 40, a brush 62 and brush spring 44 is illustrated. Brush 62 is a two material brush where the first material 68 is the standard carbon and copper material from a prior art brush. This first material extends for a distance which is less than the useable length X as is illustrated in FIG. 4A. The second material 70 is also a carbon and copper material but in the second material, the copper/carbon ratio is changed. This change in ratio would maintain the electrical conductivity of brush 62 but it could also be designed to increase the coefficient of friction between brush 62 and the shaft of rotor 20 and this increase in the coefficient of friction would create higher friction that could generate noise. Thus, as illustrated in FIG. 4B, as brush 62 approaches the end of its useable length, the reformulated or second material 70 will come into contact with the shaft of rotor 20 and the higher friction will generate noise which will provide a warning to the operator of the vehicle that the alternator is nearing the end of its useable length of brush material and that inoperability of the alternator is near. An example of the second material is a carbon and copper material having a higher percentage of copper. As an alternative to adjusting the copper/carbon ratio for second material 70, the particle sizes for second material 70 can be different than the particle sizes for first material 68 and the copper/carbon ratio can remain the same or the copper/carbon ratio can change.

Figure 5A:
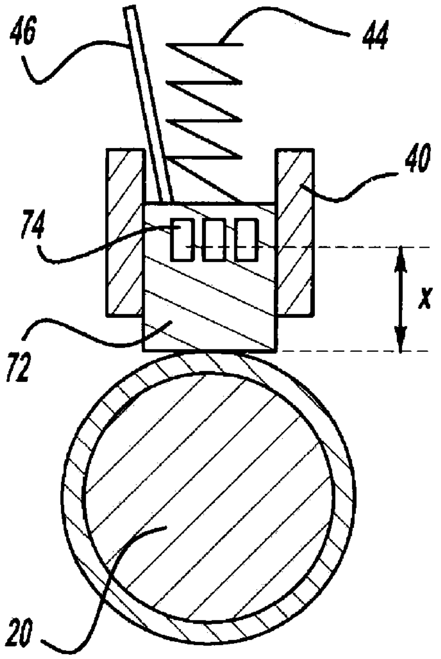
FIG. 5A is a schematic view of a new electrical brush assembly in accordance with another embodiment of the present disclosure.
Figure 5B:
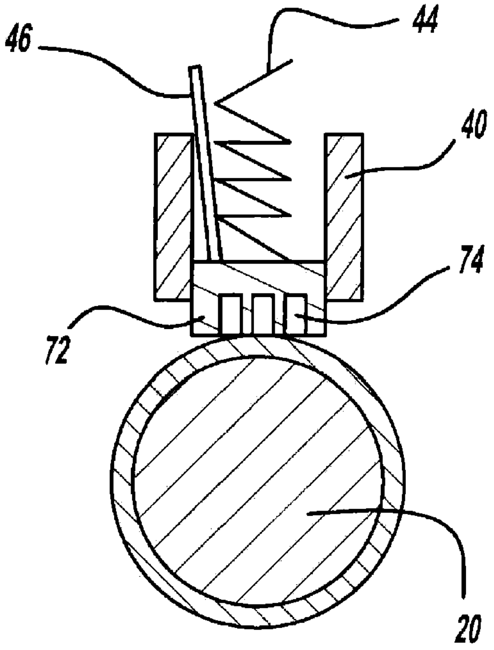
FIG. 5B is a schematic view of the electrical brush assembly in FIG. 4A in a used condition.

Referring now to FIGS. 5A and 5B, a brush assembly comprising holder 40, a brush 72 and brush spring 44 is illustrated. Brush 72 is manufactured using the standard carbon and copper material from a prior art brush, but brush 72 incorporates one or more inserts 74. Preferably, inserts 74 are electrically conductive and they are positioned in brush 72 such that the end of inserts 74 opposite to pigtail wire 46 extend into the useable length X of brush 72 as is illustrated in FIG. 5A. The material chosen for inserts 74 is a material that will generate noise due to the mechanical friction between inserts 74 and the shaft of rotor 20. Thus, as illustrated in FIG. 5B, as brush 72 approaches the end of its useable length, inserts 74 will come into contact with the shaft of rotor 20 and the mechanical friction will generate noise which will provide a warning to the operator of the vehicle that the alternator is nearing the end of its useable length of brush material and that inoperability of the alternator is near.

Figure 6A:
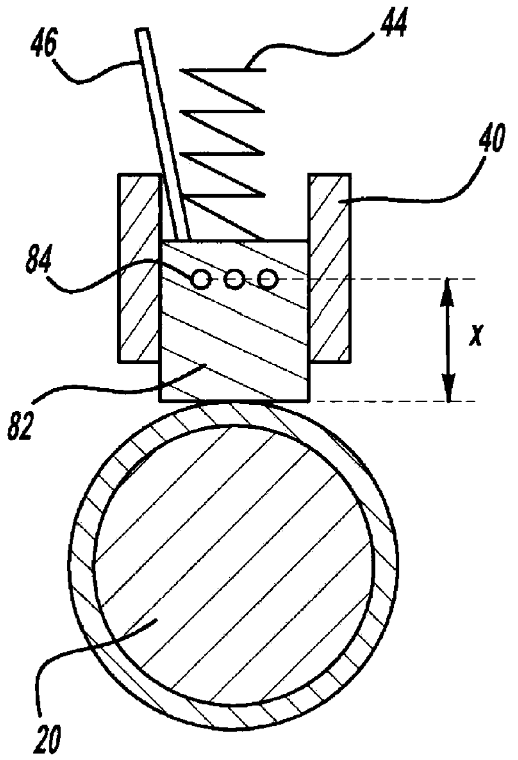
FIG. 6A is a schematic view of a new electrical brush assembly in accordance with another embodiment of the present disclosure.
Figure 6B:
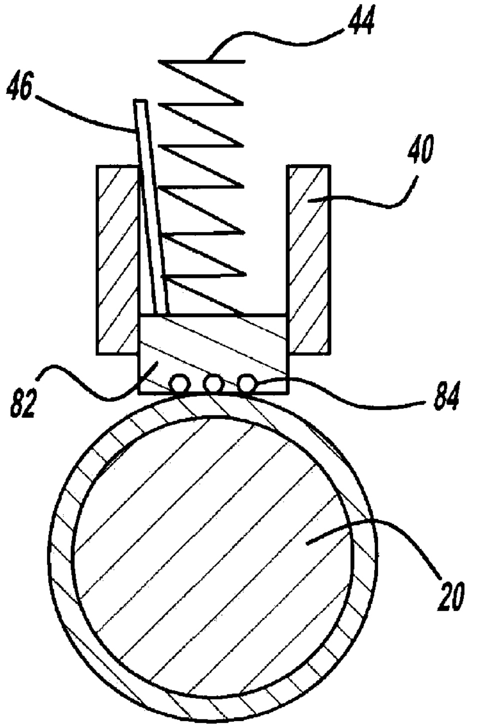
FIG. 6B is a schematic view of the electrical brush assembly in FIG. 4A in a used condition.

Referring now to FIGS. 6A and 6B, a brush assembly comprising holder 40, a brush 82 and brush spring 44 is illustrated. Brush 82 is manufactured using the standard carbon and copper material from a prior art brush, but brush 82 incorporates one or more voids or holes 84. Voids or holes 84 are positioned in brush 82 such that a portion of void or hole 84 extends into the useable length X of brush 82 as is illustrated in FIG. 6A. As brush 82 wears, voids or holes 84 will become open to the shaft of rotor 20 and the shaft of rotor 20 will slide against the edges of holes 84 to generate noise. Thus, as illustrated in FIG. 6B, as brush 82 approaches the end of its useable length, the edges of voids or holes 84 will come into contact with the shaft of rotor 20 and the mechanical friction will generate noise which will provide a warning to the operator of the vehicle that the alternator is nearing the end of the useable length of the brush material and that inoperability of the alternator is near.

Figure 7A:
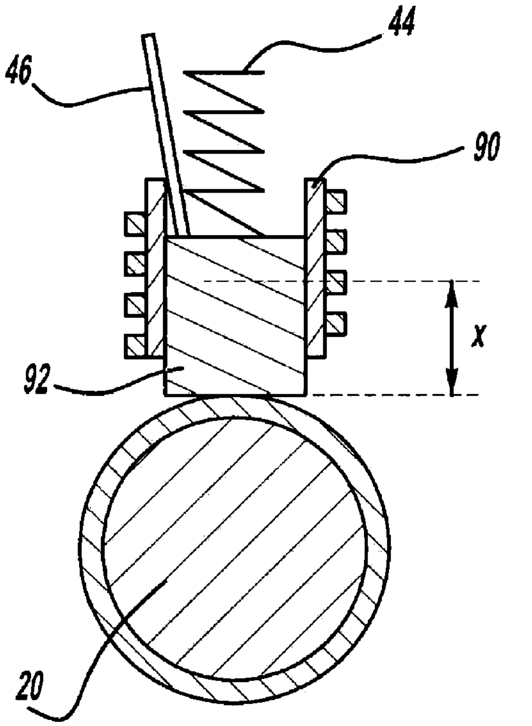
FIG. 7A is a schematic view of a new electrical brush assembly in accordance with another embodiment of the present disclosure.
Figure 7B:
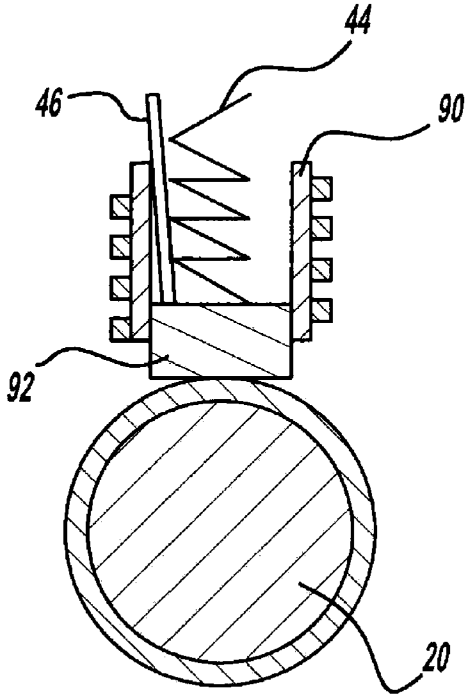
FIG. 7B is a schematic view of the electrical brush assembly in FIG. 4A in a used condition.

Referring now to FIGS. 7A and 7B, a brush assembly comprising a holder 90, a brush 92 and brush spring 44 is illustrated. Brush 92 is similar to prior art brush 52 as illustrated in FIGS. 2A and 2B, but brush 92 is designed to cooperate with holder 90 to produce noise as detailed below. Holder 90 is designed such that as brush 52 nears the end of its useable length X, the rotation of the shaft of rotor 20 will induce a resonance which will cause brush 92 and holder 90 to resonate and make an objectionable and discernable vibration noise. Thus, as illustrated in FIG. 7B, as brush 92 approaches the end of its useable length, the design of holder 90 will cause brush 92 and holder 90 to resonate and cause noise which will provide a warning to the operator of the vehicle that the alternator is nearing the end of the useable length of the brush material and that inoperability of the alternator is near. The specific design for holder 90 will be determined by the materials, size and design of the other components including brush 92, brush spring 44 and the shaft of rotor 20.

Figure 8A:
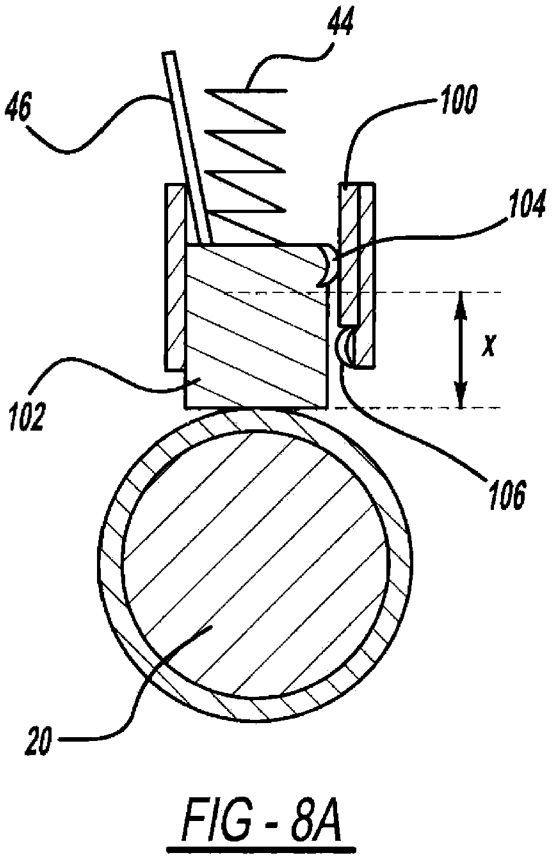
FIG. 8A is a schematic view of a new electrical brush assembly in accordance with another embodiment of the present disclosure.
Figure 8B:
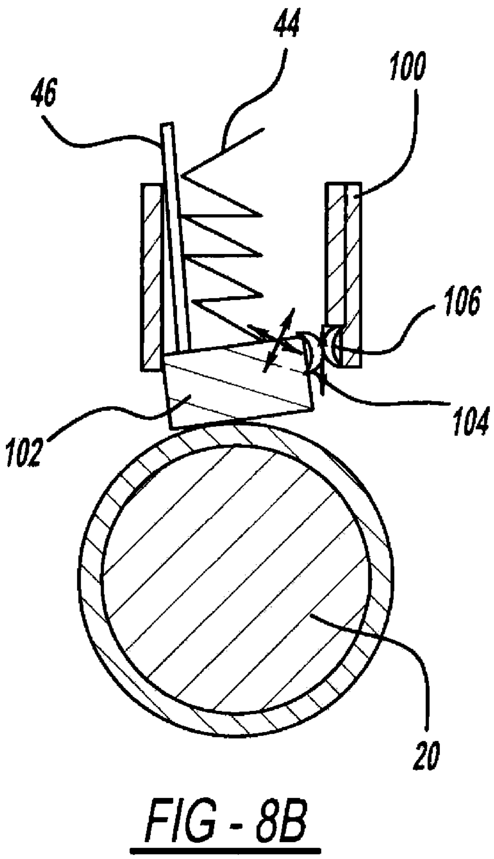
FIG. 8B is a schematic view of the electrical brush assembly in FIG. 4A in a used condition.

Referring now to FIGS. 8A and 8B, a brush assembly comprising a holder 100, a brush 102 and brush spring 44 is illustrated. Brush 102 is manufactured using the standard carbon and copper material from a prior art brush, but brush 102 incorporates one or more projections 104. Projection 104 is positioned just above the useable length X of brush 102 as illustrated in FIG. 8A. Holder 100 is similar to holder 40 except that holder 100 incorporates a projection 106 at its end nearest to the shaft of rotor 20 as illustrated in FIG. 8A. When brush 102 nears the end of its useable length, projection 104 will contact projection 106 as is illustrated in FIG. 8B. A brush which is approaching the end of its useable length will have a tendency to bounce up and down in small amounts due to the reduced load being applied by brush spring 44. This up and down movement of brush 102 will cause projection 104 to rub against projection 106 (as illustrated by the arrows in FIG. 8B) generating noise. Thus, as illustrated in FIG. 8B, as brush 102 approaches the end of its useable length, projections 104 and 106 will rub against each other generating noise which will provide a warning to the operator of the vehicle that the alternator is nearing the end of the useable length of the brush material and that inoperability of the alternator is near.

While the present disclosure was described in conjunction with an alternator, it is to be understood that any electrical machine such as a starter motor, an air conditioning blower motor or any other electric machine that utilizes brushes can incorporate the warning systems of the present disclosure.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An electric machine comprising:

a stator;

a brush movable disposed with respect to said stator; and a rotor rotatably disposed with respect to both said stator and said brush, said brush being in sliding contact with said rotor, wherein said brush comprises means for generating a noise due to said sliding contact between said brush and said rotor, wherein said generating means generates said noise only after a useable length of said brush has worn away, and said generating means comprises said brush being made from a first and a second material, said second material contacting said rotor after said first material has worn away to generate said noise due to said sliding contact with said rotor.

2. The electric machine according to claim 1 wherein said second material includes a component that generates said noise due to sliding contact with said rotor.

3. The electric machine according to claim 1, wherein said first and second materials comprise the same components, the second material having a ratio of said components different than a ratio of said components in said first material.

4. An electric machine comprising:

a stator;

a brush movable disposed with respect to said stator; and a rotor rotatably disposed with respect to both said stator and said brush, said brush being in sliding contact with said rotor, wherein said brush comprises means for generating a noise due to said sliding contact between said brush and said rotor, wherein said generating means generates means generates said noise only after a useable length of said brush has worn away and said generating means comprises one or more inserts disposed within said brush, said inserts generating said noise due to said contact with said rotor.

5. An electric machine comprising:

a stator;

a brush movable disposed with respect to said stator; and a rotor rotatably disposed with respect to both said stator and said brush, said brush being in sliding contact with said rotor, wherein said brush comprises means for generating a noise due to said sliding contact between said brush and said rotor, wherein said generating means generates said noise only after a useable length of said brush has worn away, and said generating means comprises one or more voids disposed within said brush, edges of said voids generating said noise due to said sliding contact with said rotor.

6. An electric machine comprising:

a stator;

a brush movable disposed with respect to said stator;

a rotor rotatably disposed with respect to both said stator and said brush, said brush being in sliding contact with said rotor, wherein said brush comprises means for generating a noise due to said sliding contact between said brush and said rotor, wherein said generating means generates said noise only after a useable length of said brush has worn away;

a brush holder fixedly secured with respect to said stator, said brush movably disposed within said brush holder, said generating means comprising a first device on said brush and a second device on said brush holder, movement of said first device with respect to said second device generating said noise due to said sliding contact between said brush and said rotor.

7. An electric machine comprising:

a stator;

a brush movable disposed with respect to said stator; and a rotor rotatably disposed with respect to both said stator and said brush, said brush being in sliding contact with said rotor, wherein said brush comprises means for generating a noise due to said sliding contact between said brush and said rotor and wherein said generating means comprises said brush being made from a first and a second material, said second material contacting said rotor after said first material has worn away to generate said noise due to said sliding contact with said rotor.

8. The electric machine according to claim 7, wherein said second material includes a component that generates said noise due to sliding contact with said rotor.

9. The electric machine according to claim 7, wherein said first and second materials comprise the same components, the second material having a ratio of said components different than a ratio of said components in said first material.

10. An electric machine comprising:

a stator;

a brush movable disposed with respect to said stator; and a rotor rotatably disposed with respect to both said stator and said brush, said brush being in sliding contact with said rotor, wherein said brush comprises means for generating a noise due to said sliding contact between said brush and said rotor and said generating means comprises one or more inserts disposed within said inserts generating said noise due to said sliding contact with said rotor.

11. An electric machine comprising:

a stator;

a brush movable disposed with respect to said stator; and a rotor rotatably disposed with respect to both said stator and said brush, said brush being in sliding contact with said rotor, wherein said brush comprises means for generating a noise due to said sliding contact between said brush and said rotor, wherein said generating means comprises one or more voids disposed within said brush, edges of said voids generating said noise due to said sliding contact with said rotor.

12. An electric machine comprising:

a stator;

a brush movable disposed with respect to said stator;

a rotor rotatably disposed with respect to both said stator and said brush, said brush being in sliding contact with said rotor, wherein said brush comprises means for generating a noise due to said sliding contact between said brush and said rotor; and a brush holder fixedly secured with respect to said stator, said brush movably disposed within said brush holder, said generating means comprising a first device on said brush and a second device on said brush holder, movement of said first device with respect to said second device generating said noise due to said sliding contact between said brush and said rotor.

* * * * *

UNITED STATES PATENT AND TRADEMARK OFFICE

CERTIFICATE OF CORRECTION

PATENT NO. : 7,936,105 B2
APPLICATION NO. : 12/413889
DATED : May 3, 2011
INVENTOR(S) : Robert Martin et al.

It is certified that error appears in the above-identified patent and that said Letters Patent is hereby corrected as shown below:

Col. 6, line 9, claim 4, delete “means generates”

Col. 6, line 13, claim 4, after “said” insert --sliding--

Signed and Sealed this
Twelfth Day of July, 2011

David J. Kappos
*Director of the United States Patent and Trademark Office*